(12) United States Patent
Kim

(10) Patent No.: US 12,243,550 B2
(45) Date of Patent: Mar. 4, 2025

(54) SPEECH IMAGE PROVIDING METHOD AND COMPUTING DEVICE FOR PERFORMING THE SAME

(71) Applicant: DEEPBRAIN AI INC., Seoul (KR)

(72) Inventor: Doo Hyun Kim, Gyeonggi-do (KR)

(73) Assignee: DEEPBRAIN AI INC., Seoul (KR)

( * ) Notice: Subject to any disclaimer, the term of this patent is extended or adjusted under 35 U.S.C. 154(b) by 0 days.

(21) Appl. No.: 17/764,704

(22) PCT Filed: Jul. 9, 2021

(86) PCT No.: PCT/KR2021/008823
§ 371 (c)(1),
(2) Date: Dec. 22, 2022

(87) PCT Pub. No.: WO2022/265148
PCT Pub. Date: Dec. 22, 2022

(65) Prior Publication Data
US 2024/0046951 A1 Feb. 8, 2024

(30) Foreign Application Priority Data

Jun. 16, 2021 (KR) .......................... 10-2021-0077930

(51) Int. Cl.
*G10L 21/10* (2013.01)
*G06T 7/246* (2017.01)
(Continued)

(52) U.S. Cl.
CPC .............. *G10L 21/10* (2013.01); *G06T 7/248* (2017.01); *G06T 13/205* (2013.01); *G06T 13/40* (2013.01);
(Continued)

(58) Field of Classification Search
CPC ....... G10L 21/10; G06T 7/248; G06T 13/205; G06T 13/40; G06T 13/80;
(Continued)

(56) References Cited

U.S. PATENT DOCUMENTS 11,699,455 B1 * 7/2023 Adams ..................... G10L 21/18
704/271
11,735,182 B2 * 8/2023 Kirazci .................. G10L 15/22
704/275
(Continued)

FOREIGN PATENT DOCUMENTS

JP 2012-003326 A 1/2012
KR 10-2008-0019842 A 3/2008
(Continued)

OTHER PUBLICATIONS

Amir Jamaludin et al., "You Said That ?: Synthesising Talking Faces from Audio", International Journal of Computer Vision (2019) 127, pp. 1767-1779, https://doi.org/10.1007/s11263-019-01150-y.
(Continued)

*Primary Examiner* — Sheree N Brown
(74) *Attorney, Agent, or Firm* — The PL Law Group, PLLC

(57) ABSTRACT

A speech image providing method according to an embodiment includes generating a standby state image in which a person is in a standby state, generating a plurality of back-motion images at a preset frame interval from the standby state image for image interpolation between a preset reference frame of the standby state image, generating a speech state image in which a person is in a speech state based on a source of speech content, returning the standby state image being played to the reference frame based on the plurality of back-motion images of the standby state image, based on a point of time when the generating of the speech state image is completed, and generating a synthetic speech (Continued)

image in combination with frames of the speech state image from the reference frame.

13 Claims, 7 Drawing Sheets

(51) Int. Cl.
  *G06T 13/20* (2011.01)
  *G06T 13/40* (2011.01)
  *G06T 13/80* (2011.01)
(52) U.S. Cl.
  CPC .... *G06T 13/80* (2013.01); *G06T 2207/30201* (2013.01)
(58) Field of Classification Search
  CPC ........ G06T 2207/30201; G11B 27/031; H04N 5/14; H04N 5/265; H04N 5/272; H04N 7/01; H04N 5/144; H04N 7/0137
  USPC ........................................................ 345/475
  See application file for complete search history.

(56) References Cited

U.S. PATENT DOCUMENTS

| | | | |
|---|---|---|---|
| 11,830,120 B2* | 11/2023 | Kim | G06T 13/80 |
| 11,934,445 B2* | 3/2024 | Sohail | G06F 16/24522 |
| 11,948,594 B2* | 4/2024 | Sohail | G06Q 30/0631 |
| 11,967,336 B2* | 4/2024 | Kim | H04N 7/15 |
| 12,033,258 B1* | 7/2024 | Sohail | G10L 21/10 |
| 12,079,884 B2* | 9/2024 | Park | G06Q 50/01 |
| 12,125,486 B2* | 10/2024 | Kirazci | G10L 15/22 |
| 2003/0144055 A1* | 7/2003 | Guo | G06T 13/40 |
| | | | 704/E21.02 |
| 2014/0079290 A1* | 3/2014 | Nakano | G06T 7/20 |
| | | | 382/107 |
| 2015/0371661 A1* | 12/2015 | Chapman | A63F 13/54 |
| | | | 704/270 |
| 2020/0382724 A1* | 12/2020 | Pena | G06F 3/04883 |
| 2021/0160435 A1* | 5/2021 | Pena | G06F 3/04883 |

FOREIGN PATENT DOCUMENTS

| | | |
|---|---|---|
| KR | 10-1925440 B1 | 12/2018 |
| KR | 10-2020-0145700 A | 12/2020 |
| KR | 10-2020-0145701 A | 12/2020 |
| WO | WO 2017/094527 A1 | 6/2017 |

OTHER PUBLICATIONS

Seuc-Ho Ryu et al., "A Study about a Production of A Game Character Animation Using a Combining with a Motion-capture System", The Journal of the Korea Contents Association, vol. 5, No. 5, 2005 (English Abstract is included in the first page.).

* cited by examiner

SPEECH IMAGE PROVIDING METHOD AND COMPUTING DEVICE FOR PERFORMING THE SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/008823, filed Jul. 9, 2021, which claims priority to the benefit of Korean Patent Application No. 10-2021-0077930 filed in the Korean Intellectual Property Office on Jun. 16, 2021, the entire contents of which are incorporated herein by reference.

BACKGROUND

1. Technical Field

Embodiments of the present disclosure relate to a technology for providing a speech image.

2. Background Art

With the recent technological development in the field of artificial intelligence, various types of content are being generated based on artificial intelligence (AI) technology. For example, there is a case in which, when there is a voice message to be transmitted, a speech image is generated as if a famous person (e.g., a president) speaks the voice message in order to draw people's attention. This is achieved by generating mouth shapes or the like to fit a specific message, just like a famous person speaking the specific message in an image of the famous person. In addition, technologies that allow artificial intelligence (AI) to conduct conversations with humans (e.g., video calls, or the like) are being studied. In the technologies, synthesizing the speech image takes time and requires a lot of data, and thus it is difficult to generate an image of a conversation (or an image of speech) in real time, which may be a problem.

SUMMARY

Embodiments of the present disclosure is to provide a new technology for providing an artificial intelligence-based speech image in real time.

According to an embodiment, a speech image providing method executed by a computing device including one or more processors and a memory storing one or more programs executed by the one or more processors comprises: generating a standby state image in which a person is in a standby state; generating a plurality of back-motion images at a preset frame interval from the standby state image for image interpolation between a preset reference frame of the standby state image; generating a speech state image in which a person is in a speech state based on a source of speech content; returning the standby state image being played to the reference frame based on the plurality of back-motion images of the standby state image, based on a point of time when the generating of the speech state image is completed; and generating a synthetic speech image in combination with frames of the speech state image from the reference frame.

The generating of the back-motion images may include determining a number of the back-motion images of a frame of the standby state image according to a motion speed of a person in the frame.

The generating of the back-motion images may include calculating the motion speed of the person in the frame of the standby state image, setting a basic number of interpolation frames of the frame according to the calculated motion speed of the person, and generating back-motion images in a number greater than the basic number of interpolation frames for the frame.

The setting of the basic number of interpolation frames may include setting the basic number of interpolation frames to be greater as the calculated motion speed of the person is faster, and setting the basic number of interpolation frames to be smaller as the calculated motion speed of the person is slower.

The returning of the standby state image to the reference frame may include detecting, among frames of the standby state image being played, a frame having the back-motion images closest to a point of time when the generating of the speech state image is completed; and using some back-motion images for the image interpolation, the some back-motion images being selected from among the back-motion images of the detected frame.

The back-motion images of the detected frame may be generated in a number greater than the basic number of interpolation frames set for the detected frame, and the using for the image interpolation may include selecting as many back-motion images as the basic number of interpolation frames set for the detected frame, from among the back-motion images of the detected frame.

The selecting of the back-motion images may include detecting a motion speed of a person in the detected frame, detecting a motion speed of a person in the reference frame, and selecting as many back-motion images as the basic number of interpolation frames from among the back-motion images of the detected frame, based on the motion speed of the person in the detected frame and the motion speed of the person in the reference frame.

The selecting of the back-motion images may include adjusting an interval between the selected back-motion images by comparing the motion speed of the person in the detected frame with the motion speed of the person in the reference frame.

The selecting of the back-motion images may include adjusting an interval between the selected back-motion images to be shorter as the interval is closer to the reference frame, when the motion speed of the person in the detected frame is faster than the motion speed of the person in the reference frame.

The selecting of the back-motion images may include adjusting an interval between the selected back-motion images to be longer as the interval is closer to the reference frame, the longer, when the motion speed of the person in the detected frame is slower than the motion speed of the person in the reference frame.

According to another embodiment, a speech image providing method executed by a computing device including one or more processors and a memory storing one or more programs executed by the one or more processors comprises: generating a standby state image in which a person in a standby state; generating a plurality of back-motion images at a preset frame interval from the standby state image for image interpolation between a preset reference frame of the standby state image; transmitting a source of speech content to a server; receiving a speech state image in which a person is in a speech state from the server; returning the standby state image being played to the reference frame based on the plurality of back-motion images of the standby state image, based on a point of time when the speech state image is received; and generating a synthetic speech image in combination with frames of the speech state image from the reference frame.

According to another embodiment, a computing device including one or more processors and a memory storing one or more programs executed by the one or more processors comprises: a standby state image generating module configured to generate a standby state image in which a person is in a standby state, and generate a plurality of back-motion images at a preset frame interval from the standby state image for image interpolation between a preset reference frame of the standby state image; a speech state image generating module configured to generate a speech state image in which a person is in a speech state based on a source of speech content; and an image playback module configured to return the standby state image being played to the reference frame based on the plurality of back-motion images of the standby state image, based on a point of time when the generating of the speech state image is completed, and generate a synthetic speech image in combination with frames of the speech state image from the reference frame.

According to another embodiment, a computing device including one or more processors and a memory storing one or more programs executed by the one or more processors comprises: a standby state image generating module configured to generate a standby state image in which a person is in a standby state, and generate a plurality of back-motion images at a preset frame interval from the standby state image for image interpolation between a preset reference frame of the standby state image; and an image playback module configured to transmit a source of the speech content to a server, receive a speech state image in which a person is in a speech state from the server, return the standby state image being played to the reference frame based on the plurality of back-motion images of the standby state image, based on a point of time when the speech state image is received, and generate a synthetic speech image in combination with frames of the speech state image from the reference frame.

According to the disclosed embodiments, the standby state image is prepared in advance, and the speech state image is generated during playback of the standby state image and combined with the standby state image, thereby making it possible to generate the synthetic speech image in real time, and accordingly, possible to provide conversation-related services based on artificial intelligence in real time.

In addition, the synthetic speech image is generated by generating image part for face portion of a person in the standby state image when generating the speech state image, and replacing the face portion of the standby state image with the image part of the speech state image, thereby making is possible to reduce the amount of data while reducing the time required for generating the synthetic speech image.

In addition, a back-motion image is provided in the frame of the standby state image, the standby state image being played is returned to the preset reference frame through the back-motion image, and then and is combined with the speech state image from the reference frame of the standby state image, thereby making it possible to easily generate the synthetic speech image even without considering other factors, no matter when the speech state image is generated during playback of the standby state image.

In addition, the intervals of the back-motion images to be used for interpolation based on the difference between motion speeds when the motion speed of the person in the standby state image being played is different from the motion speed of the person in the speech state image when the generation of the speech state image has been completed, thereby making it possible to express the motion of the person in the synthetic speech image more naturally.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the following description, the terminology "transmission", "communication", "reception" of a signal or information and terminology similar thereto may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same is true for "reception" of the signal or information. In addition, in the present specification, a meaning in which two or more pieces of data or information are "related" indicates that when any one piece of data (or information) is obtained, at least a portion of other data (or information) may be obtained based thereon.

Further, it will be understood that, although the terms first, second, etc. may be used herein to describe various elements, these elements should not be limited by these terms. These terms may be used to distinguish one element from another element. For example, without departing from the scope of the present disclosure, a first element could be termed a second element, and similarly, a second element could be termed a first element.

Figure 1:
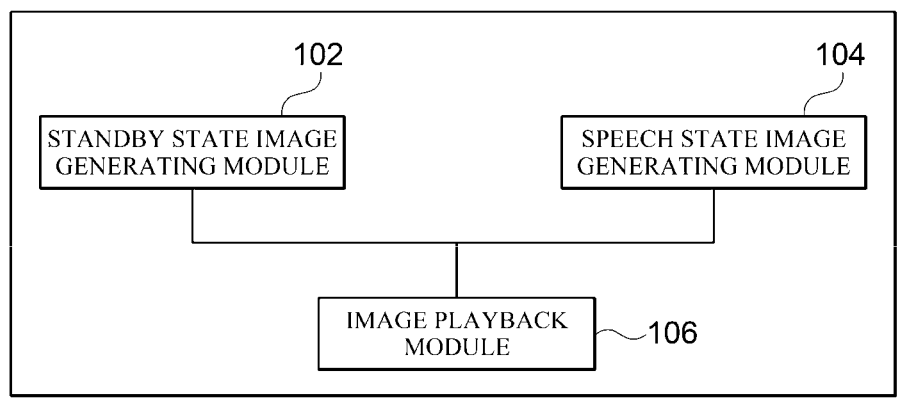
FIG. 1 is a block diagram illustrating a configuration of a speech image providing device according to an embodiment of the present disclosure.

FIG. 1 is a block diagram illustrating a configuration of a speech image providing device according to an embodiment of the present disclosure.

Referring to FIG. 1, the speech image providing device 100 may include a standby state image generating module 102, a speech state image generating module 104, and an image playback module 106.

In an embodiment, the standby state image generating module 102, the speech state image generating module 104, and the image playback module 106 may be implemented by using one or more physically separated devices, or may be implemented by one or more processors or a combination of one or more processors and software, and may not be clearly distinguished in specific operations, unlike the illustrated example.

In an exemplary embodiment, the speech image providing device 100 may be a device for performing a conversation (AI conversation), a video call (AI video call), or the like, using artificial intelligence, but is not limited thereto. The speech image providing device 100 may generate a speech image (e.g., a speech image for a conversation or video call) based on artificial intelligence, and may display the generated speech image on a screen or transmit it to the outside (e.g., a terminal of the conversation partner or a relay server that relays the terminal of the conversation partner and the speech image providing device 100).

For example, the speech image providing device 100 may be installed in a user terminal that wants to have a conversation with artificial intelligence, and may be installed in various devices or facilities such as an unmanned ordering kiosk, an electronic information desk, an outdoor advertising screen, a robot, or the like.

Here, the speech image is a synthesized image based on artificial intelligence, and is an image in which a predetermined person is speaking. Here, the predetermined person may be a virtual person or a person widely known to the public, but is not limited thereto.

The standby state image generating module 102 may generate an image in which a person in the image is in a standby state (hereinafter, may be referred to as a standby state image). Here, the standby state may be a state before the person in the image speaks (e.g., a state in which the person is listening to the other party or a state in which there is no speech before there is a conversation, or the like).

The standby state image generating module 102 may generate a standby state image having a preset playback time (e.g., 5 seconds, 30 seconds, or the like). The standby state image may be provided to express a natural motion while the person in the image is in the standby state. That is, the standby state image may be provided to naturally represent the facial expression, posture, and action (e.g., nodding, holding hands and listening, tilting the head, and smiling) of the person in the image while the person is listening to the other party.

The standby state image has a preset playback period and includes a plurality of frames. In addition, each frame of the standby state image may include a changed image in order to express a natural motion while the person in the image is in the standby state. In an exemplary embodiment, the standby state image may be provided to be returned from the last frame to the first frame again and repeatedly played, when being played from the first frame to the last frame.

The standby state image generating module 102 may generate a back-motion image in addition to each frame of the standby state image. The back-motion image may be for image interpolation between an arbitrary frame of the standby state image and a preset reference frame of the standby state image. Hereinafter, it will be described that the reference frame is the first frame of the standby state image as an example. However, the reference frame is not limited thereto.

The standby state image generating module 102 may generate the back-motion image so as to naturally connect an arbitrary frame of the standby state image with the first frame (that is, reference frame) of the standby state image when the standby state image is returned from the arbitrary frame to the first frame.

Figure 2:
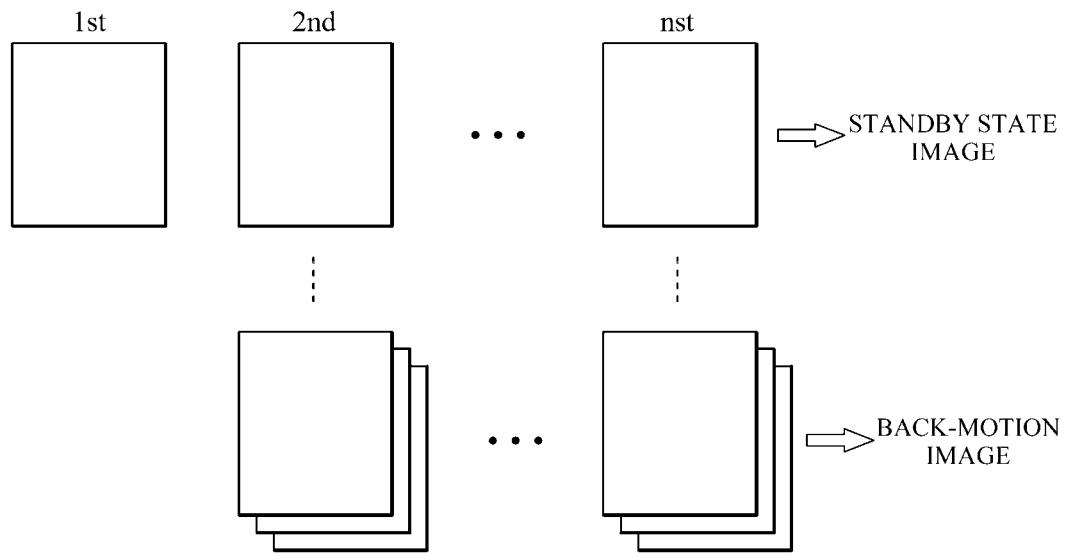
FIG. 2 is a diagram schematically illustrating a state in which back-motion images are generated in a frame of a standby state image in an embodiment of the present disclosure.

In an exemplary embodiment, as illustrated in FIG. 2, the standby state image generating module 102 may generate back-motion images for each frame (from the second (2nd) frame to the nth (nst) frame) except for the first (1st) frame in the standby state image. That is, the standby state image generating module 102 may generate the back-motion image for each of frames except for the first frame of the standby state image for image interpolation between the corresponding frame and the first frame. In this case, one or more back-motion images may be provided for each frame. However, the back-motion images are not limited thereto, and may be generated at a preset frame interval (or a preset time interval) in the standby state image.

The standby state image generating module 102 may determine the number of back-motion images of the corresponding frame according to the motion speed of a person in the corresponding frame. Specifically, the standby state image generating module 102 may calculate the motion speed of the person within each of the frames of the standby state image. For example, the standby state image generating module 102 may extract a feature point of the person (e.g., a facial feature point) for each of the frames of the standby state image, and calculate the motion speed of the person in the corresponding frame based on the difference between the extracted feature point and that of the previous frame (or subsequent frame (that is, the amount of change in the position of the pixel per time, as the amount of motion change of the feature point).

The standby state image generating module 102 may set the basic number of interpolation frames based on the motion speed of the person in the corresponding frame. Here, the basic number of interpolation frames may mean the number of back-motion images actually used for image interpolation between the corresponding frame and the first frame.

The standby state image generating module 102 may set the basic number of interpolation frames in proportion to the motion speed of the person in each frame. That is, the standby state image generating module 102 may set a greater basic number of interpolation frames as the motion speed of the person in the corresponding frame is faster, and may generate a fewer basic number of interpolation frames as the motion speed of the person in the corresponding frame is slower.

The standby state image generating module 102 may determine the number of back-motion images of the corresponding frame based on the basic number of interpolation frames set for the corresponding frame. In an exemplary embodiment, the standby state image generating module 102 may generate the back-motion images in an amount equal to or greater than twice the basic number of interpolation frames set for the corresponding frame. For example, when the basic number of interpolation frames set for the corresponding frame is four, the standby state image generating module 102 may generate eight or more back-motion images.

The speech state image generating module 104 may generate an image in which a person in the image (a person having the same identity as the person in the standby state image) is in a speech state (hereinafter, referred to as a speech state image). Here, the speech state may refer to a state in which the person in the image is speaking (e.g., a state in which the person is speaking to the other party in a conversation, a video call, or the like).

The speech state image generating module 104 may generate a speech state image based on the source of input speech content. The source of speech content may be in the form of text, but is not limited thereto, and may be in the form of a voice.

The source of speech content may be generated through artificial intelligence by the speech image providing device 100 analyzing the speech of the other party, but is not limited thereto, and may be input from an external device (not shown) (e.g., a device that analyzes the speech of the other party and generates the source of speech content) or an administrator. Hereinafter, it will be described that the source of speech content is text as an example.

The speech state image generating module 104 may generate an audio part and an image part for a speech state image based on text of speech content (e.g., "Hello, I am AI tutor Danny"), and generate the speech state image by combining the generated audio part and the image part. The text-based audio and video generation technology is a known technology, and therefore a detailed description thereof will be omitted.

When generating the image part based on the text of speech content, the speech state image generating module 104 may generate an image part for a face portion of the person in the standby state image. In this way, by generating the image part for the face portion of the person in the speech state image, it is possible to generate the speech state image more quickly while reducing the data capacity.

The image playback module 106 may play the standby state image generated by the standby state image generating module 102. The image playback module 106 may play the standby state image and provide it to the conversation partner. In an exemplary embodiment, the image playback module 106 may play the standby state image and display it on a screen provided in the speech image providing device 100. In this case, the conversation partner may have a conversation with the person in the image while looking at the screen of the speech image providing device 100.

In addition, the image playback module 106 may play the standby state image and transmit it to an external device (e.g., a terminal of the conversation partner or a relay server). In this case, the conversation partner may receive the image through his/her terminal (e.g., smartphone, tablet PC, laptop computer, desktop PC, or the like), or an unmanned ordering kiosk, an electronic information desk, an outdoor advertising screen, or the like to have a conversation with the person in the image.

When the speech state image is generated while the standby state image is being played, the image playback module 106 may generate a synthetic speech image by combining the standby state image and the speech state image, and play the synthetic speech image. The image playback module 106 may provide the synthetic speech image to the conversation partner.

Figure 3:
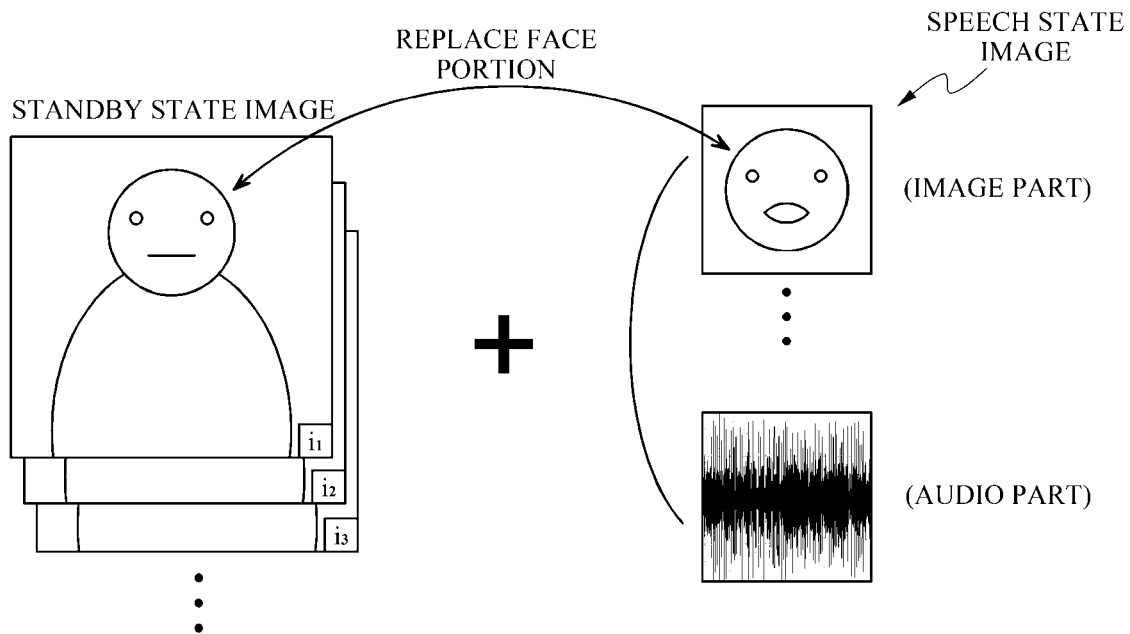
FIG. 3 is a diagram schematically illustrating a state of combining a standby state image and a speech state image in an embodiment of the present disclosure.

FIG. 3 is a diagram schematically illustrating a state of combining a standby state image and a speech state image in an embodiment of the present disclosure. Referring to FIG. 3, the image playback module 106 may generate a synthetic speech image by replacing the face portion of the standby state image with the image part (that is, the face portion of the person) of the speech state image and combining the replaced image and the voice part of the speech state image.

In an exemplary embodiment, when the generation of the speech state image is completed during playback of the standby state image, the image playback module 106 may return the standby state image to the reference frame and generate the synthetic speech image in combination with frames of the speech state image from the preset reference frame of the standby state image. For example, the combination of the standby state image and the speech state image may be performed in a first frame of the standby state image.

In this case, by standardizing a combining point of the standby state image and the speech state image as the reference frame of the standby state image, it is possible to combine the standby state image and the speech state image to easily generate the synthetic speech image, even without considering other factors (e.g., the network environment between the speech image providing device 100 and the terminal of the other party), no matter when the speech state image is generated during playback of the standby state image.

In this case, the image playback module 106 may return the standby state image being played to the first frame (that is, the reference frame) in order to combine the first frame of the standby state image and the speech state image, and then may combine the first frame of the standby state image and the speech state image.

That is, when a source of speech content is input while the image playback module 106 is playing the standby state image, the speech state image generating module 104 may generate the speech state image based on the source of the speech content. When the generation of the speech state image is completed, the image playback module 106 may return the standby state image to the first frame using, as interpolation images, the back-motion images at the closest point of time to the point of time when the generation of the speech state image is completed.

Figure 4:
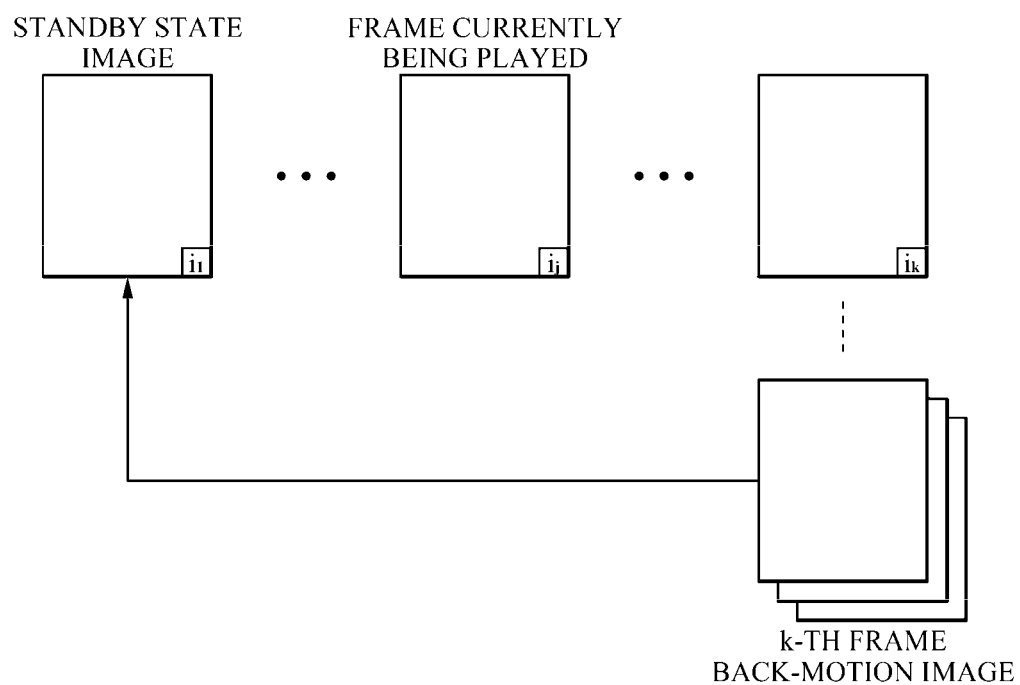
FIG. 4 is a diagram schematically illustrating a state in which an image playback module returns a standby state image being played to the first frame in an embodiment of the present disclosure.

FIG. 4 is a diagram schematically illustrating a state in which the image playback module 106 returns a standby state image being played to the first frame in an embodiment of the present disclosure. Referring to FIG. 4, when the generation of the speech state image is completed at the j-th frame of the standby state image during playback of the standby state image, the image playback module 106 may detect the closest frame having back-motion images among frames after the j-th frame of the standby state image which is currently being played.

For example, when the closest frame having back-motion images among frames after the j-th frame is the k-th frame, the image playback module 106 may return the standby state image to the first frame using the back-motion images of the k-th frame. That is, the image playback module 106 may play the back-motion images of the k-th frame to naturally return the standby state image to the first frame. At this time, the back-motion images of the k-th frame play a role in naturally connecting the k-th frame of the standby state image to the first frame of the standby state image (in other words, the first frame of the speech state image (since the first frame of the standby state image and the first frame of the speech state image are combined)).

When the speech state image ends during playback of the synthetic speech image, the image playback module 106 may play the standby state image again from the end point of time of the speech state image. When the standby state image ends, the image playback module 106 may use the back-motion images of the last frame of the standby state image to return the standby state image to the first frame thereof and play the standby state image again.

According to the disclosed embodiments, the standby state image is prepared in advance, and the speech state image is generated during playback of the standby state image and combined with the standby state image, thereby making it possible to generate the synthetic speech image in real time, and accordingly, possible to provide conversation-related services based on artificial intelligence in real time.

In addition, the synthetic speech image is generated by generating the image part for the face portion of the person in the standby state image when generating the speech state image, and replacing the face portion of the standby state image with the image part of the speech state image, thereby making is possible to reduce the amount of data while reducing the time required for generating the synthetic speech image.

In addition, it is possible to provide back-motion images for the frame of the standby state image, returning the standby state image being played to the first frame through the back-motion images, and then combining the first frame of the standby state image and the speech state image, thereby easily generating the synthetic speech image even without considering other factors, no matter when the speech state image is generated during playback of the standby state image.

In the present specification, a module may mean a functional and structural combination of hardware for carrying out the technical idea of the present disclosure and software for driving the hardware. For example, the "module" may mean a logical unit of a predetermined code and a hardware resource for executing the predetermined code, and does not necessarily mean physically connected code or a single type of hardware.

Meanwhile, at the point of time when the generation of the speech state image is completed, the motion speed of the person in the standby state image being played may be different from the motion speed of the person in the speech state image. In this case, when the first frame of the standby state image and the speech state image are combined, the motion of the person in the synthetic speech image may appear unnaturally.

Therefore, in the disclosed embodiment, the image playback module 106 may select back-motion images to be used for interpolation from among the back-motion images of the k-th frame based on the motion speed of the person in the k-th frame of the standby state image and the motion speed of the person in the first frame of the speech state image in FIG. 4. Here, the motion speed of the person in the first frame of the speech state image may be set to be the same as the motion speed of the person in the first frame of the standby state image.

Specifically, the back-motion images of the k-th frame may be generated in a number twice the basic number of interpolation frames set for the k-th frame or more. However, the number of back-motion images to be used for actual interpolation between the k-th frame of the standby state image and the first frame of the standby state image is as much as the basic number of interpolation frames set for the k-th frame.

That is, when generating back-motion images in each frame of the standby state image, the standby state image generating module 102 generates the back-motion images in a number twice the number to be used for actual interpolation (the basic number of interpolation frames) or more. Furthermore, the image playback module 106 may select only the number of back-motion images corresponding to the basic number of interpolation frames of the corresponding frame from among the back-motion images and use them for actual interpolation.

In this case, the image playback module 106 may select as many back-motion images to be used for interpolation as the basic number of the interpolation frames set for the k-th frame, from among the back-motion images of the k-th frame based on the motion speed of the person in the k-th frame of the standby state image and the motion speed of the person in the first frame of the speech state image.

Figure 5:
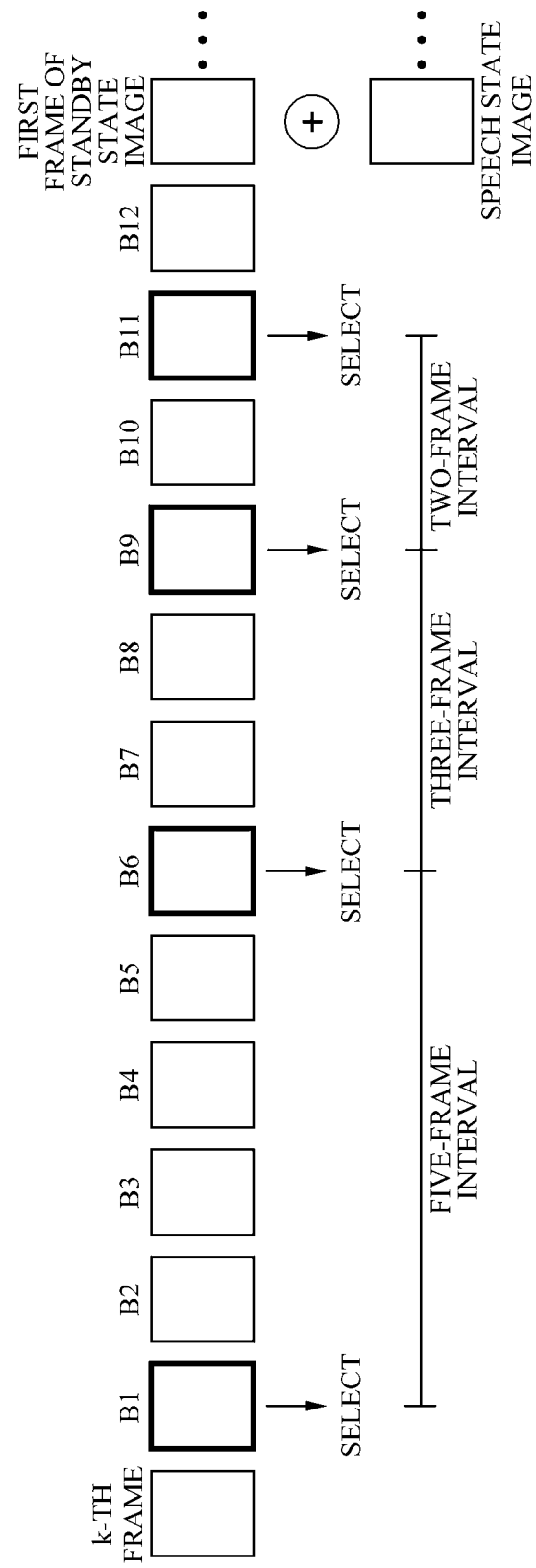
FIGS. 5 and 6 are diagrams schematically illustrating a state in which the image playback module selects and extracts back-motion images to be used for interpolation among back-motion images of a frame in an embodiment of the present disclosure.

FIG. 5 is a diagram schematically illustrating a state in which the image playback module 106 selects and extracts back-motion images to be used for interpolation among back-motion images of frames in an embodiment of the present disclosure. Referring to FIG. 5, the back-motion images of the k-th frame may be arranged in a series of sequences between the k-th frame of the standby state image and the first frame of the standby state image.

The back-motion images forming a series of sequences may be generated such that a back-motion image closer to the k-th frame is more similar to the k-th frame, and a back-motion image closer to the first frame of the standby state image is more similar to the first frame of the standby state image. Here, it is assumed that the basic number of interpolation frames set for the k-th frame is 4, and the number of back-motion images for the k-th frame is 12.

The image playback module 106 may select, as back-motion images to be used for actual interpolation, back-motion images (four back-motion images in FIG. 5) in a number corresponding to the basic number of the interpolation frames from among a series of back-motion images (12 back-motion images in FIG. 5) based on the difference between the motion speed of the person in the k-th frame of the standby state image and the motion speed of the person in the first frame of the speech state image.

The image playback module 106 may adjust an interval between back-motion images to be used for actual interpolation depending on the difference between the motion speed of the person in the k-th frame of the standby state image and the motion speed of the person in the first frame of the speech state image.

For example, when the motion speed of the person in the k-th frame of the standby state image is faster than the motion speed of the person in the first frame of the speech state image, the image playback module 106 may select back-motion images in a number corresponding to the preset basic number of preset interpolation frames from among a series of back-motion images, where the closer to the first frame of the standby state image, the shorter the interval between selected back-motion images.

That is, as illustrated in FIG. 5, the image playback module 106 may select, as the back-motion images to be used for interpolation, a first back-motion image 1B, a sixth back-motion image 6B, a ninth back-motion image 9B, and an eleventh back-motion image 11B, from among a series of 12 back-motion images B1 to B12.

In this case, the interval between the first back-motion image 1B and the sixth back-motion image 6B is a five-frame interval, the interval between the sixth back-motion image 6B and the ninth back-motion image 9B is a three-frame interval, and the interval between the ninth back-motion image 9B and the eleventh back-motion image 11B is a two-frame interval, and as a result, the closer to the first frame of the standby state image, the shorter the interval between the selected back-motion images.

In this way, by making the interval between the selected back-motion images shorter as it is closer to the first frame of the standby state image when the motion speed of the person in the k-th frame of the standby state image is faster than the motion speed of the person in the first frame of the speech state image, the motion speed of the person in the selected back-motion images approaches the motion speed of the person in the first frame of the speech state image during playback of the selected back-motion images, so that the motion of the person in the synthetic speech image is naturally expressed.

On the other hand, when the motion speed of the person in the k-th frame of the standby state image is slower than the motion speed of the person in the first frame of the speech state image, the image playback module 106 may select back-motion images in a number corresponding to the preset basic number of interpolation frames from among a series of back-motion images such that the closer to the first frame of the standby state image, the longer the interval between selected back-motion images.

Figure 6:
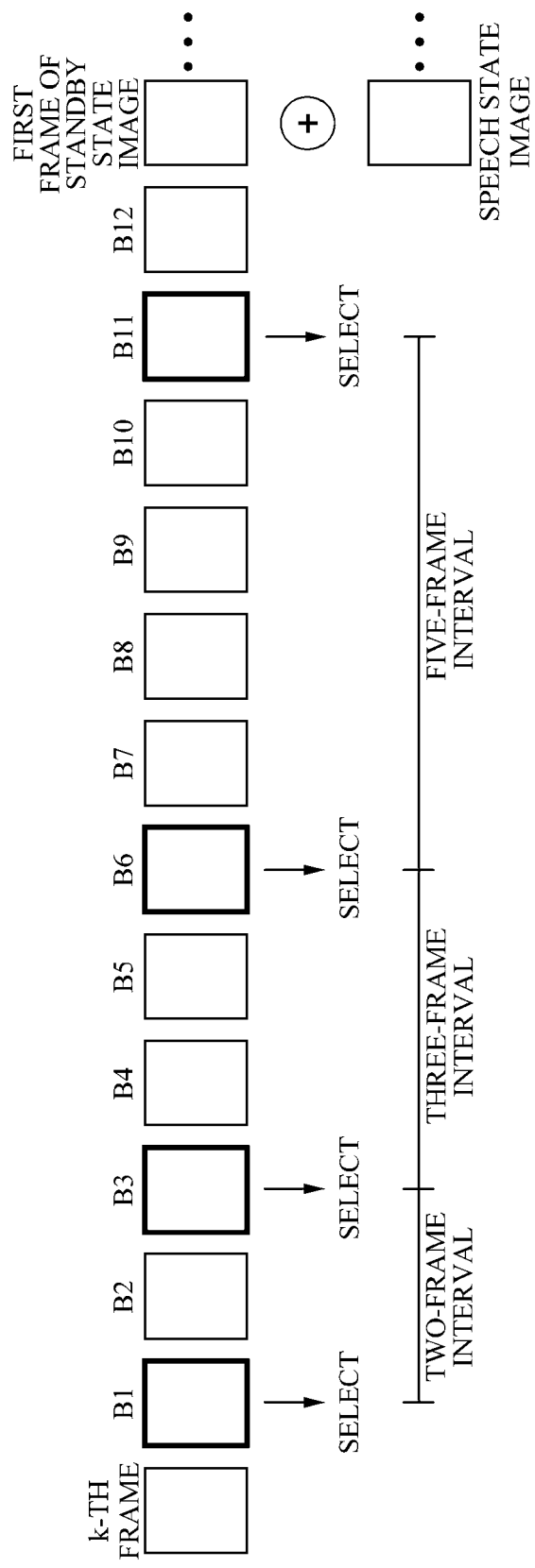

That is, as illustrated in FIG. 6, the image playback module 106 may select, as the back-motion images to be used for interpolation, a first back-motion image 1B, a third back-motion image 3B, a sixth back-motion image 6B, and an eleventh back-motion image 11B, from among a series of 12 back-motion images.

In this case, the interval between the first back-motion image 1B and the third back-motion image 3B is a two-frame interval, the interval between the third back-motion image 3B and the sixth back-motion image 6B is a three-frame interval, and the interval between the sixth back-motion image 6B and the eleventh back-motion image 11B is a five-frame interval, and as a result, the closer to the first frame of the standby state image, the longer the interval between the selected back-motion images.

In this way, by making the interval between the selected back-motion images longer as it is closer to the first frame of the standby state image when the motion speed of the person in the k-th frame of the standby state image is slower than the motion speed of the person in the first frame of the speech state image, the motion speed of the person in the selected back-motion images approaches the motion speed of the person in the first frame of the speech state image during playback of the selected back-motion images, so that the motion of the person in the synthetic speech image is naturally expressed.

Figure 7:
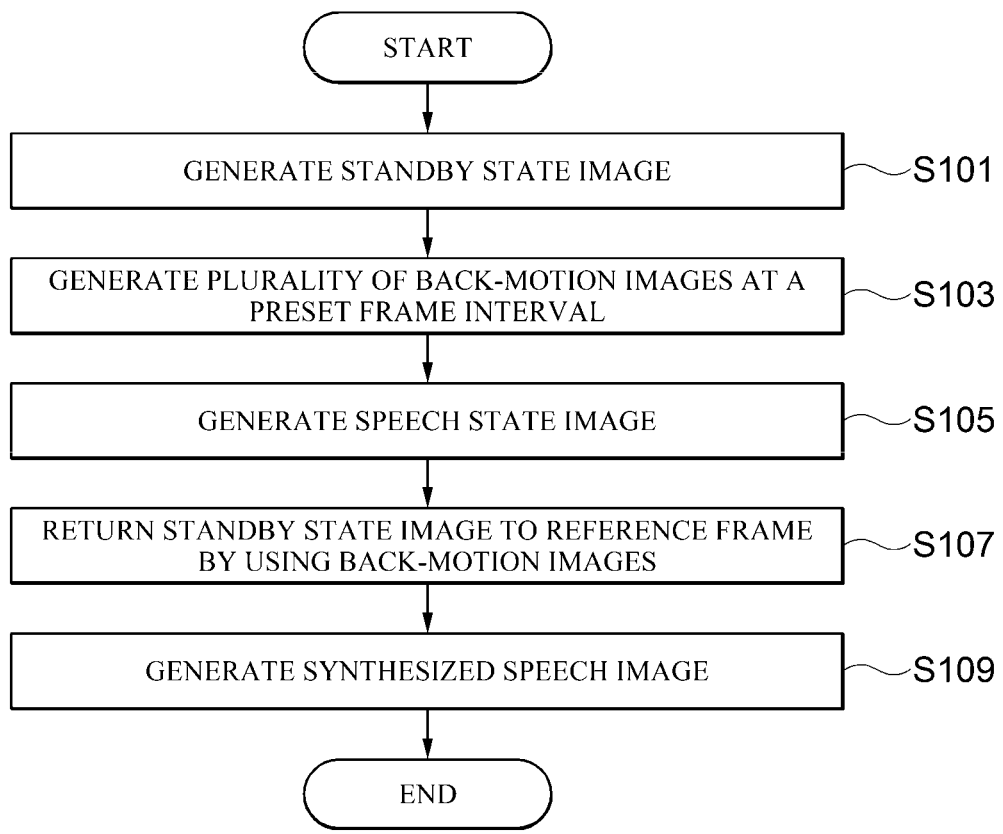
FIG. 7 is a flowchart illustrating a speech image providing method according to an embodiment of the present disclosure.

FIG. 7 is a flowchart illustrating a speech image providing method according to an embodiment of the present disclosure. In the illustrated flowchart, the method is divided into a plurality of steps; however, at least some of the steps may be performed in a different order, performed together in combination with other steps, omitted, performed in subdivided steps, or performed by adding one or more steps not illustrated.

Referring to FIG. 7, the speech image providing device 100 generates a standby state image in which a person in the image is in a standby state (S101). The standby state image may have a preset playback time.

Next, the speech image providing device 100 generates a plurality of back-motion images at a preset frame interval from the standby state image for image interpolation between a preset reference frame of the standby state image (S103).

In this case, the speech image providing device 100 may determine the number of back-motion images of the corresponding frame depending on the motion speed of the person in the corresponding frame. The speech image providing device 100 may set the basic number of interpolation frames based on a motion speed of the person in the frame, and may generate back-motion images in a number greater than the set basic number of interpolation frames (e.g., twice or more).

Next, the speech image providing device 100 generates a speech state image in which a person in the image is in a speech state based on a source of input speech content (S105). In this case, the speech image providing device 100 may play the standby state image independently of the generation of the speech state image. The standby state image may be returned from the last frame to the first frame again and repeatedly played, when being played from the first frame to the last frame.

Next, the speech image providing device 100 returns the standby state image being played to the reference frame based on the plurality of back-motion images of the standby state image, based on a point of time when generation of the speech state image is completed (S107).

The speech image providing device 100 may detect a frame having back-motion images closest to the point of time when generation of the speech state image is completed, in the standby state image, and then may return the standby state image to the reference frame based on the back-motion images of the detected frame. The speech image providing device 100 may select back-motion images to be used for actual interpolation based on the motion speed of the person in the detected frame and the motion speed of the person in the preset reference frame.

Next, the speech image providing device 100 generates a synthetic speech image in combination with the frame of the speech state image from the reference frame of the standby state image (S109).

Figure 8:
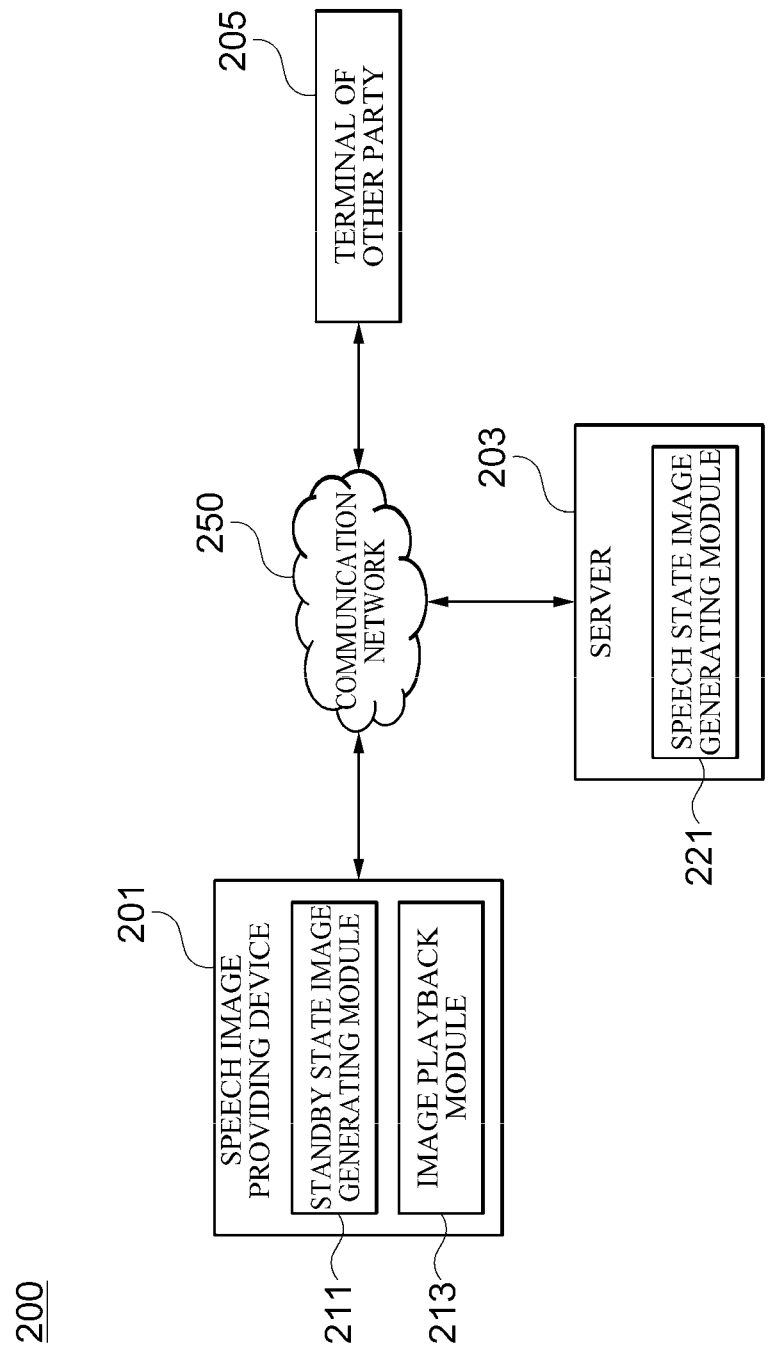
FIG. 8 is a block diagram illustrating a configuration of a speech image providing system according to an embodiment of the present disclosure.

FIG. 8 is a block diagram illustrating a configuration of a speech image providing system according to an embodiment of the present disclosure.

Referring to FIG. 8, a speech image providing system 200 may include a speech image providing device 201, a server 203, and a terminal 205 of the other party. The speech image providing device 201 may be communicatively connected to the server 203 and the terminal 205 of the other part through a communication network 250.

In some embodiments, the communication network 250 may include the Internet, one or more local area networks, wide area networks, cellular networks, mobile networks, other types of networks, or a combination of the above networks.

The speech image providing device 201 may include a standby state image generating module 211 and an image playback module 213. Here, the standby state image generating module 211 is the same as the standby state image generating module 102 shown in FIG. 1, and thus a detailed description thereof will be omitted.

When a source of speech content is input, the image playback module 213 may transmit the source of speech content to the server 203. The server 203 may generate a speech state image based on the source of speech content. That is, the server 203 may include a speech state image generating module 221. In an exemplary embodiment, the server 203 may generate a speech state image (that is, an audio part and an image part) from the source of speech content based on machine learning technology. The server 203 may transmit the generated speech state image to the image playback module 213.

The image playback module 213 may play the standby state image and provide it to the terminal 205 of the other party. When a preset time amount of speech state image is received from the server 203 during playback of the standby state image, the image playback module 213 may generate a synthetic speech image by combining the received speech state image and the standby state image. The image playback module 213 may provide the synthetic speech image to the terminal 205 of the other party.

When a next time amount of speech state image is not received from the server 203, the image playback module 213 may wait until the next time amount of speech state image is received from the server 203 and then generate a synthetic speech image by combining the received speech state image and the standby state image.

Figure 9:
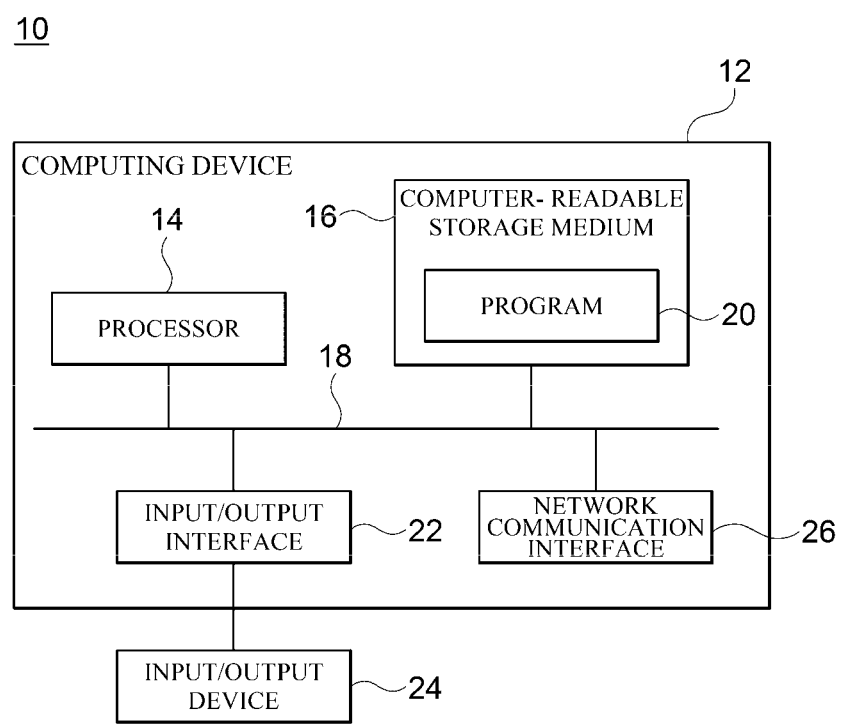
FIG. 9 is a block diagram exemplarily illustrating a computing environment that includes a computing device suitable for use in exemplary embodiments.

FIG. 9 is a block diagram exemplarily illustrating a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the speech image providing device 100 or 201. The computing device 12 may be the server 203.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A method for providing speech image, the method executed by a computing device including one or more processors and a memory storing one or more programs executed by the one or more processors, the method comprising:
   generating a standby state image in which a person is in a standby state;
   generating a plurality of back-motion images at a preset frame interval from the standby state image for image interpolation between a preset reference frame of the standby state image;
   generating a speech state image in which a person is in a speech state based on a source of speech content;
   returning the standby state image being played to the reference frame based on the plurality of back-motion images of the standby state image, based on a point of time when the generating of the speech state image is completed; and
   generating a synthetic speech image in combination with frames of the speech state image from the reference frame.

2. The method of claim 1, wherein the generating of the back-motion images comprises determining a number of the back-motion images of a frame of the standby state image according to a motion speed of a person in the frame.

3. The method of claim 2, wherein the generating of the back-motion images comprises:
   calculating the motion speed of the person in the frame of the standby state image;
   setting a basic number of interpolation frames of the frame according to the calculated motion speed of the person; and generating back-motion images in a number greater than the basic number of interpolation frames for the frame.

4. The method of claim 3, wherein the setting of the basic number of interpolation frames comprises setting the basic number of interpolation frames to be greater as the calculated motion speed of the person is faster, and setting the basic number of interpolation frames to be smaller as the calculated motion speed of the person is slower.

5. The method of claim 1, wherein the returning of the standby state image to the reference frame comprises:
detecting, among frames of the standby state image being played, a closest frame having the back-motion images based on the point of time when the generating of the speech state image is completed; and
using some back-motion images for the image interpolation, the some back-motion images being selected from among the back-motion images of the detected frame.

6. The method of claim 5, wherein the back-motion images of the detected frame are generated in a number greater than the basic number of interpolation frames set for the detected frame; and
the using for the image interpolation comprises selecting as many back-motion images as the basic number of interpolation frames set for the detected frame, from among the back-motion images of the detected frame.

7. The method of claim 6, wherein the selecting of the back-motion images comprises:
detecting a motion speed of a person in the detected frame;
detecting a motion speed of a person in the reference frame; and
selecting as many back-motion images as the basic number of interpolation frames from among the back-motion images of the detected frame, based on the motion speed of the person in the detected frame and the motion speed of the person in the reference frame.

8. The method of claim 7, wherein the selecting of the back-motion images comprises adjusting an interval between the selected back-motion images by comparing the motion speed of the person in the detected frame with the motion speed of the person in the reference frame.

9. The method of claim 7, wherein the selecting of the back-motion images comprises adjusting an interval between the selected back-motion images to be shorter as the interval is closer to the reference frame, when the motion speed of the person in the detected frame is faster than the motion speed of the person in the reference frame.

10. The method of claim 7, wherein the selecting of the back-motion images comprises adjusting an interval between the selected back-motion images to be longer as the interval is closer to the reference frame, when the motion speed of the person in the detected frame is slower than the motion speed of the person in the reference frame.

11. A method for providing speech image, the method executed by a computing device including one or more processors and a memory storing one or more programs executed by the one or more processors, the method comprising:

generating a standby state image in which a person is in a standby state;
generating a plurality of back-motion images at a preset frame interval from the standby state image for image interpolation between a preset reference frame of the standby state image;
transmitting a source of speech content to a server;
receiving a speech state image in which a person is in a speech state from the server;
returning the standby state image being played to the reference frame based on the plurality of back-motion images of the standby state image, based on a point of time when the speech state image is received; and
generating a synthetic speech image in combination with frames of the speech state image from the reference frame.

12. A computing device comprising:
one or more processors; and
a memory storing one or more programs executed by the one or more processors;
a standby state image generating module configured to generate a standby state image in which a person is in a standby state, and generate a plurality of back-motion images at a preset frame interval from the standby state image for image interpolation between a preset reference frame of the standby state image;
a speech state image generating module configured to generates a speech state image in which a person is in a speech state based on a source of speech content; and
an image playback module configured to return the standby state image being played to the reference frame based on the plurality of back-motion images of the standby state image, based on a point of time when the generating of the speech state image is completed, and generate a synthetic speech image in combination with frames of the speech state image from the reference frame.

13. A computing device comprising:
one or more processors; and
a memory storing one or more programs executed by the one or more processors;
a standby state image generating module configured to generate a standby state image in which a person is in a standby state, and generate a plurality of back-motion images at a preset frame interval from the standby state image for image interpolation to a preset reference frame of the standby state image; and
an image playback module configured to transmit a source of speech content to a server, receive a speech state image in which a person is in a speech state from the server, return the standby state image being played to the reference frame based on the plurality of back-motion images of the standby state image, based on a point of time when the speech state image is received, and generate a synthetic speech image in combination with frames of the speech state image from the reference frame.

* * * * *